United States Patent [19]

Kurihara

[11] Patent Number: 5,303,995
[45] Date of Patent: Apr. 19, 1994

[54] DRAWER-CONTAINING APPARATUS

[75] Inventor: Kazumasa Kurihara, Utsunomiya, Japan

[73] Assignee: Nifco Inc., Yokohama, Japan

[21] Appl. No.: 818,559

[22] Filed: Jan. 9, 1992

[30] Foreign Application Priority Data

Jan. 14, 1991 [JP] Japan ................... 3-014837

[51] Int. Cl.⁵ .................. A47B 88/00; B60R 5/00
[52] U.S. Cl. ................... 312/319.1; 312/333
[58] Field of Search ............. 292/DIG. 4, 145; 312/319.1, 330.1, 333

[56] References Cited

U.S. PATENT DOCUMENTS

| | | | |
|---|---|---|---|
| 3,854,785 | 12/1974 | Manner et al. | 292/DIG. 4 |
| 4,792,165 | 12/1988 | Nishimura | 292/DIG. 4 |
| 4,815,774 | 3/1989 | Correnti | 292/145 |
| 4,838,626 | 6/1989 | Pau | 312/333 |
| 5,020,845 | 6/1991 | Falcoff et al. | 292/DIG. 4 X |

Primary Examiner—Peter R. Brown
Attorney, Agent, or Firm—Oblon, Spivak, McClelland, Maier & Neustadt

[57] ABSTRACT

A drawer-containing apparatus is disclosed which comprises a box-like housing to be fixed to a pigeon-hole or the like, an accommodating case held for forward and backward movement through a front opening of the housing, a biasing member for urging the accommodating case toward its protruded position, and a push-push locking member for, in general, locking the accommodating case at its retreated position in the housing against the biasing force of the biasing member, the push-push locking member releasing the accommodating case from the locking action thereof to allow opening motion of the accommodating case by the biasing force of the biasing member when an ordinary force for opening is exerted on the accommodating case; wherein, between the housing and the accommodating case, an unlockable safety lock mechanism is provided for preventing protrusion of the accommodating case due to release of the accommodating case from the locking action of the push-push locking member caused by an unforeseen accident.

3 Claims, 5 Drawing Sheets

DRAWER-CONTAINING APPARATUS

BACKGROUND OF THE INVENTION

1. Field of the Invention

The present invention relates to a drawer-containing apparatus provided in a piece of furniture, a business machine or the like.

2. Discussion of Background

In a drawer-containing apparatus of this type, various measures have been taken to enable a case to be smoothly drawn from and pushed into a fixed housing. Japanese Unexamined Patent Publication No. 199140/1988 discloses an example of such drawer-containing apparatus.

This drawer-containing apparatus comprises a box-like housing to be fixed, a case held for forward and backward movement through a front opening of the housing, a biasing means for urging the case toward its protruded position, and a push-push locking mechanism for locking the case in its retreated position in the housing against the biasing force of the biasing means. With respect to the push-push locking mechanism, when the front surface of the case is further pushed backwardly, the case is released from the locking action of the push-push locking mechanism and pushed to its open position by the biasing force of the biasing means.

The drawer-containing apparatus has an advantage in that, by virtue of the use of the push-push locking mechanism, operation for releasing the case from the locking action thereof is simple. On the other hand, however, the apparatus has a drawback in that when the apparatus is subjected to some shock due to earthquake, mischief of a child or the like, the case is likely to be released from the locking action of the locking mechanism, thereby causing protrusion of the case. Such unexpected protrusion of the case not only makes an obstacle but also impairs safety since one is likely to hit oneself against the protruded case, thereby leading to a decreased commercial value.

SUMMARY OF THE INVENTION

It is, therefore, an object of the present invention to provide a drawer-containing apparatus free from protrusion of the accommodating case due to an unforeseen accident and excellent in safety.

It is another object of the present invention to provide drawer-containing apparatus equipped with a safety lock mechanism with simple arrangement which enables the increase in production cost owing to the equipment of the safety lock mechanism to be minimized, thereby enabling increased commercial value to be attained.

To attain the above-mentioned objects, a drawer-containing apparatus of the present invention comprises:

a box-like housing to be fixed to a pigeon-hole or the like, an accommodating case held for forward and backward movement through a front opening of the housing, a biasing member for urging the accommodating case toward its protruded position, and a push-push locking member for, in general, locking the accommodating case at its retreated position in the housing against the biasing force of the biasing member, the push-push locking member releasing the accommodating case from the locking action thereof to allow opening motion of the accommodating case by the biasing force of the biasing member when an ordinary force for opening is exerted on the accommodating case;

wherein, between the housing and the accommodating case, an unlockable safety lock mechanism is provided for preventing protrusion of the accommodating case due to release of the accommodating case from the locking action of the push-push locking member caused by an unforeseen accident.

According to the present invention, even if the accommodating case is pushed accidentally when an accommodating case stands under the locking action of the safety lock mechanism, which accidental push otherwise makes an operation causing protrusion, it is possible by the action of the safety lock mechanism to prevent protrusion of the accommodating case.

The safety lock mechanism may comprise:

a knob member slidable in parallel with the front opening of the housing, and a stopper unified and movable together with the knob member, the stopper being inserted into an aperture bored in a side wall of the accommodating case for safety.

Accordingly, the present invention can be put into practice with minimized design change and increase in cost owing to the equipment of the safety lock mechanism, and can prevent the accidental protrusion of the accommodating case from taking place, thereby providing increased safety of the drawer-containing apparatus of this type.

The above and other objects and advantages of the present invention will be readily understood from the following description with reference to the accompanying drawings.

DESCRIPTION OF THE PREFERRED EMBODIMENT

Now, an embodiment of the present invention will be described more in detail with reference to the drawings.

FIGS. 1 to 8 illustrate one embodiment of the drawer-containing apparatus according to the present invention. The drawer-containing apparatus of the embodiment comprises a housing 1 to be fixed to a pigeon-hole or the like, a tray 2 as an accommodating case disposed in the housing 1 for accommodation and drawing, and a safety lock mechanism 30 mounted on the housing 1.

Figure 2:
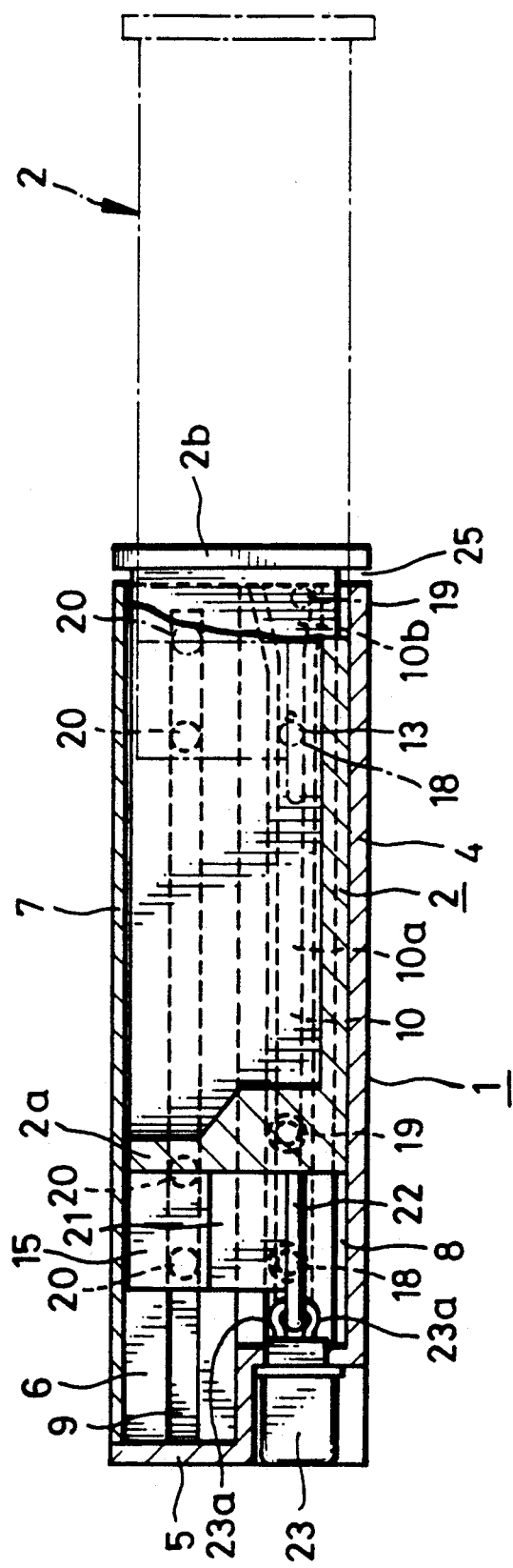
FIG. 2 is a vertical sectional view taken along line A—A in FIG. 1.
Figure 6:
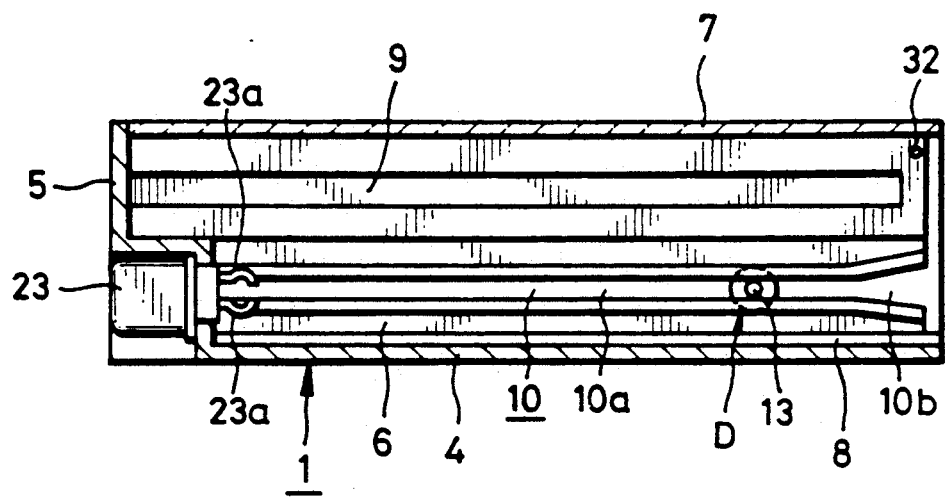
FIG. 6 is a vertical sectional view of the housing shown in FIG. 1.
Figure 7:
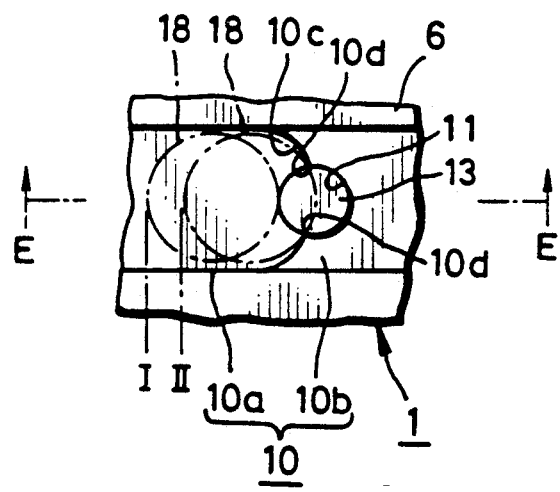
FIG. 7 is an enlarged view of D-portion in FIG. 6.
Figure 8:
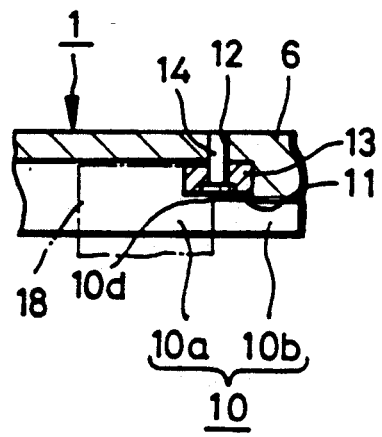
FIG. 8 is horizontal sectional view taken along line E—E in FIG. 7.

The housing 1 is formed into a frontally open box-like shape by unifying a bottom wall 4, a rear wall 5 disposed upright at the rear of the bottom wall 4, right and left side walls 6,6, and a top wall 7 (see, FIGS. 2 and 6). The top wall 7 is made of a metal plate, and all of the other walls are molded plastic parts.

The bottom wall 4 is formed with a continuous regulation groove 8 running substantially along its centerline from the rear end to the front end of the bottom wall 4.

The right and left side walls 6,6 are substantially symmetrically formed. Each of the side walls 6,6 is formed with an engagement groove 9 and an introduction groove 10 in its inner side, which extend from the rear end to the front end of the side wall. The introduction groove 10 is composed of a first groove portion 10a and a second groove portion 10b. The first groove portion 10a has a depth greater than that of the second groove portion 10b. The end portion of the first groove portion 10a is formed as a curved end jutting out toward the end portion 10c of the second groove portion 10b.

In the boundary portion between the first groove portion 10a and the second groove portion 10b (see, FIG. 7: this portion corresponds to the end portion of the first groove portion 10a and the complementary end portion 10c of the second groove portion 10b), the end portion 10c of the second groove portion 10b has a crescent-like notch, and a buffer member 13 is provided in the round space 11 consisting of the crescent-like notched space and the complementary gibbous-like space. A through-hole 12 is formed in the housing 1 concentrically with the round space 11.

The buffer member 13 is made of a rubber, a flexible plastic or the like, and has a shape of a circular disc corresponding to the shape of the round space 11. A support pin 14 runs through the center of the buffer member 13 with its tip portion projected from the buffer member 13.

The tip portion of the support pin 14 is inserted into the through-hole 12, and simultaneously, the buffer member 13 is set at the round space 11. Consequently, the buffer member 13 is located with its portion jutting out into the first groove portion 10a.

The tray 2 is a molded plastic part, and has a frontally open box-like shape. Beyond the rear wall 2a, an extension arm 15 of each of the side walls of the tray 2, which extension arm 15 is integrally formed therewith, extends backwardly.

Figure 5:
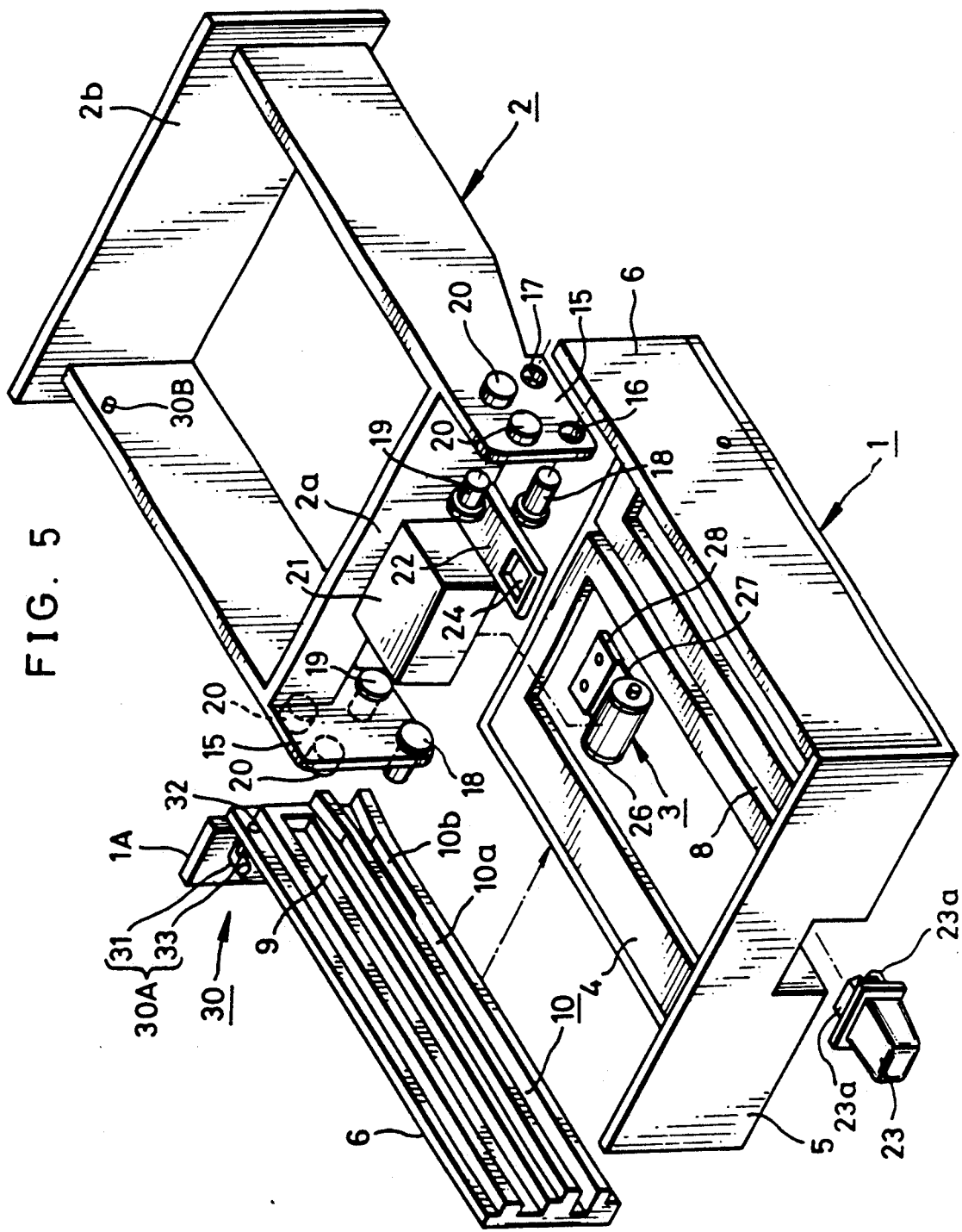
FIG. 5 is an exploded perspective view of the drawer-containing apparatus shown in FIG. 1.

In each of the extension arm 15, as shown in FIG. 5, two through-holes 16, 17 are formed, which are spaced in the longitudinal direction in conformity with the direction of the introduction groove 10. Into the through-hole 16 is pushed an engaging pin 18 from the inside of the extension arm 15 so that the tip portion of the engaging pin 18 juts out toward the outside of the extension arm 15. Likewise, an engaging pin 19 is pushed into the through hole 17 from the inside of the extension arm 15 so that the tip portion of the engaging pin 19 juts out toward the outside of the extension arm 15. The tip portion of the engaging pin 18 functions as a guide which is engaged with the first groove portion 10a. The length of the tip portion of the engaging pin 18 protruded from the extension arm 15 is substantially equal to the depth of the first groove portion 10a. The length of the tip portion of the engaging pin 19 protruded from the extension arm 15 is designed to be substantially equal to the depth of the second groove portion 10b.

On the outer surface of each of the extension arms 15,15, two projecting pins 20 are also provided, which are spaced in the longitudinal direction in conformity with the direction of the engaging groove 9.

Between the two extension arms 15,15, a block portion 21 and an engaging piece 22 are located, which are formed outside of the rear wall 2a integrally therewith. The block portion 21 has an empty interior, and defines a concave portion open at its bottom. A constant-pressure spring member 3 operated by a spiral spring is disposed in the open cavity.

The engaging piece 22 is provided as a counterpart of the push-push locking member 23 mounted on the rear wall 5 of the housing 1, and hence it has at its tip portion an engaging aperture 24 which is engaged with latch arms 23a,23a of the push-push locking member 23.

With respect to the push-push locking means 23 described herein, when the engaging piece 22 is inserted between the latch arms 23a,23a and pushed against the push-push locking means 23, the latch arms 23a,23a capture the engaging piece 22 to effect locking, and then when the engaging piece 22 is pushed once more against the push-push engaging member 23, the engaging piece 22 is unlocked. Specifically, as far as the push-push locking means is concerned, the technique known from Japanese Unexamined Utility Model Publication No. 163870/1986 is utilized.

Figure 3:
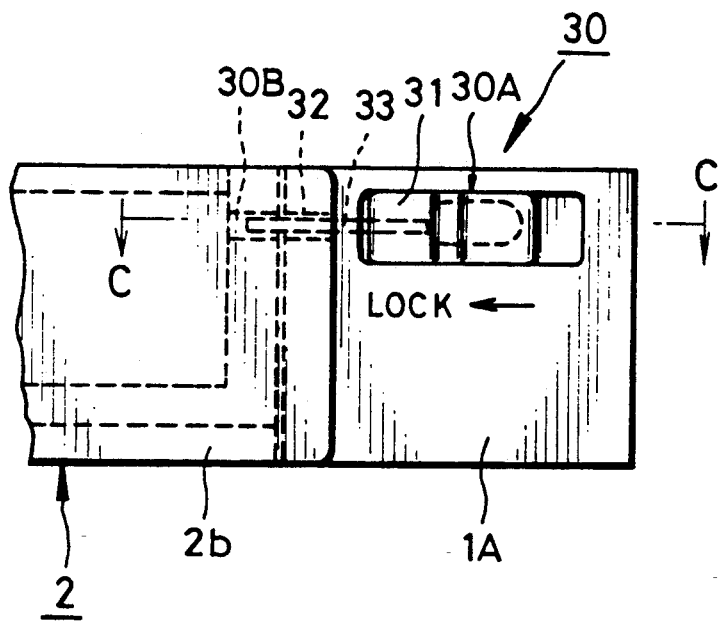
FIG. 3 is an enlarged partial front view of the drawer-containing apparatus, which is taken along line B—B in FIG. 1.
Figure 4:
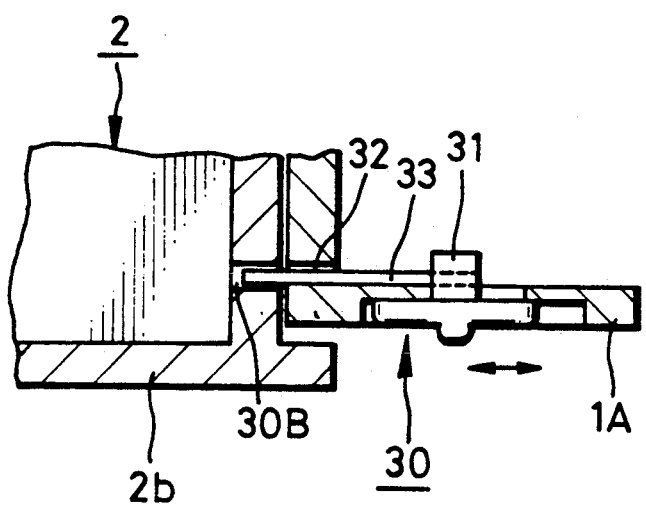
FIG. 4 is a horizontal sectional view taken along line C—C in FIG. 3.

The safety lock mechanism 30 comprises a lock member 30A provided on the housing 1, and an engaging aperture 30B, as a counterpart of the lock member 30A, which is formed in the tray 2, as shown in FIGS. 3 and 4.

The lock member 30A comprises a knob member 31 slidablly operable from the front side of the panel member 1A of the housing 1, and a pin-like stopper 33 which is unified and movable along with the knob member 31 and which is to be inserted into the aperture 32 in the side wall 6.

When the lock member 30A is slidingly shifted in the direction of the arrow "LOCK" shown in FIG. 3 with the tray 2 fully retreated in the housing 1, the tip portion of the stopper 33 is caused to jut out through the aperture 32 of the housing 1 into the engaging aperture 30B of the tray 2, thus locked state is attained. Consequently, protrusion of the tray 2 is prevented under such safely locked state.

On the other hand, from the above state, when the knob member 31 is slidingly shifted in the direction reverse to the direction of the arrow "LOCK" shown in FIG. 3, the tip portion of the stopper 33 is pulled out of the engaging aperture 30B, the safety lock mechanism 30 is brought out of operation, thereby enabling the tray 2 to be drawn.

When the drawer-containing apparatus having a structure as described above is assembled, the knob member 31 preliminarily incorporated in the housing 1 is slidingly shifted in the direction reverse to the direction of the arrow "LOCK" shown in FIG. 3 to cause the tip of the stopper 33 to be withdrawn from the inside of the housing 1. Then, the projecting pins 20,20 are engaged with the engaging groove 9, and simultaneously, the engaging pins 18,19 are engaged with the introduction groove 10. The tray 2 is placed in the housing 1 with a rib 25, which is formed on the lower side of the bottom of the tray 2, engaged with the regulation groove 8. At this time, the constant-pressure spring member 3 is incorporated into the open cavity of the block portion 21.

Then, the front end of a spring strip leaf 27 wound on the spool 26 is forwardly introduced from the open cavity along with the bottom wall 4 of the housing 1, and a piece 28 provided at the front end of the spring strip 27 is secured to the bottom wall 4, so that the tray 2 is moved forwardly by coiling force of the spring strip 27, thereby enabling the tray to be automatically drawn.

When a drawer-containing apparatus is assembled, the housing 1 of the apparatus is secured to a storage portion of a pigeon-hole (not shown).

Figure 1:
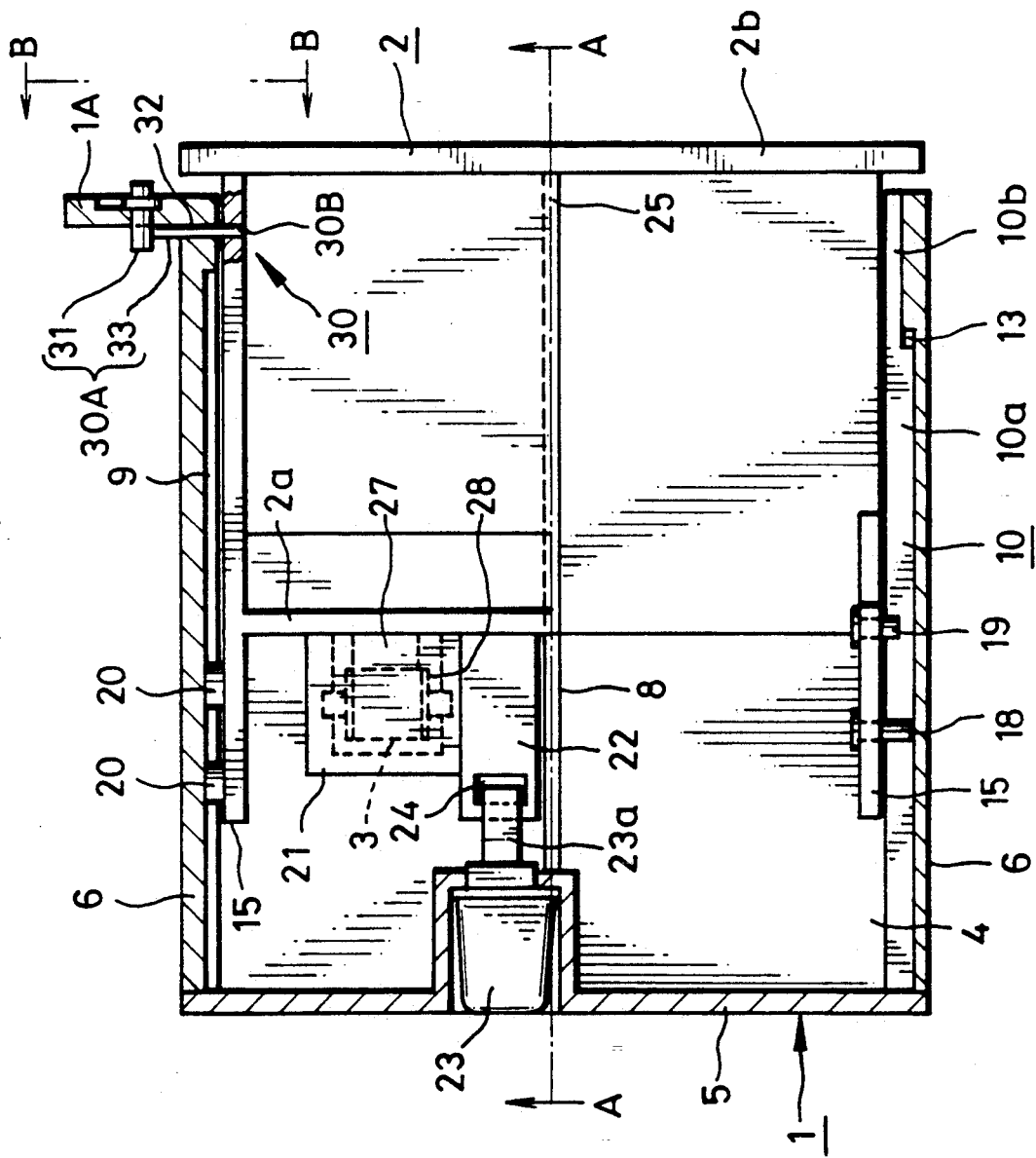
FIG. 1 is a plan view of the drawer-containing apparatus of the present invention with an accommodating case accommodated therein, wherein one half of the case is viewed from above and the other half is viewed from below, and wherein the housing is sectionally shown.

When the tray 2 is accommodated in the housing 1, the spring strip 27 of the constant-pressure spring member 3 is unwound, i.e., the constant-pressure spring member 3 is on, and the engaging piece 22 is captured by latch arms 23a, 23a, i.e., the engaging piece 22 is held under the condition shown in FIGS. 1 and 2 in the solid lines.

On the other hand, when the tray 2 in the accommodated state is drawn, the front surface 2b of the tray 2 is pushed. In this case, if the knob member 31 is in the "LOCK" position and hence the safety lock mechanism 30 is in operation, the knob member 31 is slid in the direction reverse to the direction of the arrow "LOCK" to bring the safety lock mechanism 30 out of operation. When the front surface 2b of the tray 2 is pushed, the engaging piece 22 is caused to push the latch arms 23a,23a of the push-push lock member 23 partly into the push-push lock member 23. Consequently, the engaging piece 22 under the action of the push-push lock member 23 is unlatched, so that the tray 2 is released from the locking action of the push-push lock member 23. Upon being unlocked, the tray 2 is forwardly drawn to the position shown in FIG. 2 in the chain-dotted lines by coiling force of the constant-pressure spring member 3, at which the tip portion of the engaging pin 18 as a guide is confronted by the end portion 10c and hence further advance of the guide can no longer be made. According to the constitution of this embodiment, with respect to the confrontation of the engaging pin 18 with the end portion 10c, the engaging pin 18 does not directly encounter the with the end portion 10c, i.e., the engaging pin 18 is first confronted by the buffer member 13 located at the round space 11 (see, the position indicated by Roman numeral I in FIG. 7) to cause compressive deformation of the buffer member 13, and as a result, the engaging pin 18 comes in contact with the end portion 10c (see, the position indicated by Roman numeral II in FIG. 7). Consequently, It is possible to reduce impactive noise and vibration attributable to the butting of the engaging pin 18 against the end portion 10c. In addition, when the engaging pin 18 is in contact with the end portion 10c, the two edges 10d,10d of the notched portion 11 of the end portion 10c abut upon the periphery of the engaging pin 18, so that the two edges 10d,10d, exert a force on the engaging pin 18 to stably put the engaging pin 18 on the center line between the two edges 10d,10d, thereby permitting stable abutment of the engaging pin 18 with the end portion 10c. When the tray 2 is in the drawn state where it is fully drawn from the housing 1, small articles and the like can be stored into or taken out from the tray 2.

Thereafter, when the tray 2 which has been drawn is pushed into the housing 1, the engaging piece 22 which has been brought to the advanced position by the unlatching operation moves along with the tray 2, and the latch arms 23a,23a of the push-push locking member 23 again capture the engaging piece 22 at the position slightly before the accommodated position of the tray 2.

When the tray 2 is released from the pushing force at the position just behind the accommodated position where any further backward movement of the tray 2 into the housing 1 can no longer be made, the tray 2 is again accommodated in the housing 1 with the engaging piece 22 captured by the latch arms 23a,23a. This condition is shown in FIGS. 1 and 2 in solid lines, and maintained for storage. Under this condition, when the knob member 31 is slided in the direction of the arrow "LOCK" to bring the safety lock mechanism 30 into operation, even if the tray 2 is exposed to a casual shock, the tray 2 remains stand still, thereby preventing casual protrusion of the tray 2.

The present invention has been described with respect to the drawer-containing apparatus to be incorporated in a pigeon-hole as its preferred embodiment. However, it is understood that the present invention is by no means restricted to the specific embodiment and can be widely utilized as a drawer-containing apparatus to be incorporated in a piece of furniture, a business machine, an airplane, a ship or the like. It is further understood by those skilled in the art that changes and modifications can be made without departing from the spirit and scope of the present invention.

What is claimed is:

1. A drawer-containing apparatus for a vehicle which comprises:
   a box-like housing,
   an accommodating case mounted within said housing for forward and backward movement through a front opening of said housing,
   a biasing member provided between said accommodating case and said housing for urging said accommodating case toward a protruded position, and
   a push-push locking mechanism interconnected between said accommodating case and said housing for locking said accommodating case at a retreated position in said housing against the biasing force of said biasing member, said push-push locking mechanism releasing said accommodating case from a locking action thereof to allow opening motion of said accommodating case by the biasing force of said biasing member when an ordinary force for opening is exerted on said accommodating case;
   wherein, between said housing and said accommodating case, a releasable safety lock mechanism is provided for engaging said accommodating case and preventing protrusion of said accommodating case due to release of said accommodating case from the locking action of said push-push locking mechanism caused by unintended exertion of a force such that said accommodating case is maintained in the retracted position
   wherein said safety lock mechanism comprises:
   a knob member mounted on said housing slidable in parallel with the front opening of the housing, and
   a stopper unified and movable together with said knob member, the stopper being inserted into an aperture bored in a side wall of the accommodating case for safety.

2. A drawer-containing apparatus which comprises:
   a box-like housing,
   an accommodating case mounted within said housing for forward and backward movement through a front opening of said housing,
   a biasing member provided between said accommodating case and said housing for urging said accommodating case toward a protruded position, and a push-push locking mechanism interconnected between said accommodating case and said housing for locking said accommodating case at a retreated position in said housing against the biasing force of said biasing member, said push-push locking mechanism releasing said accommodating case from a locking action thereof to allow opening motion of said accommodating case by the biasing force of said biasing member when an ordinary force for opening is exerted on said accommodating case;

wherein, between said housing and said accommodating case, a releasable safety lock mechanism is provided for engaging said accommodating case and preventing protrusion of said accommodating case due to release of said accommodating case from the locking action of said push-push locking mechanism caused by unintended exertion of a force such that said accommodating case is maintained in the retreated position, said releasable safety lock mechanism including an actuator mounted upon said housing, wherein a flange is connected to said housing and includes said actuator mounted thereon.

3. A drawer-containing apparatus for a vehicle which comprises:

a box-like housing;

an accommodating case mounted within said housing for forward and backward movement through a front opening of said housing;

a biasing member provided between said accommodating case and said housing for urging said accommodating case toward a protruded position; and a push-push locking mechanism interconnected between said accommodating case and said housing for locking said accommodating case at a retreated position in said housing against the biasing force of said biasing member, said push-push locking mechanism releasing said accommodating case from a locking action thereof to allow opening motion of said accommodating case by the biasing force of said biasing member when an ordinary force for opening is exerted on said accommodating case;

wherein, between said housing and said accommodating case, a readily recognizable and releasable safety lock mechanism is provided for engaging said accommodating case and preventing protrusion of said accommodating case due to release of said accommodating case from the locking action of said push-push locking mechanism caused by unintended exertion of a force such that said accommodating case is maintained in the retracted position, said safety lock mechanism including a manual actuator movable between a lock position and a release position without requiring the use of a key or a combination or a secret combination of operations wherein said releasable safety lock mechanism includes a knob mounted upon said housing as said manual actuator, said knob having a pin associated therewith which extends into an aperture provided in said accommodating case when said releasable safety lock mechanism is in the lock position, and wherein said pin is located outside of said aperture when said safety lock mechanism is in the release position.

* * * * *